United States Patent
Stawiaski et al.

(10) Patent No.: US 11,941,859 B2
(45) Date of Patent: Mar. 26, 2024

(54) CAMERA AND METHOD FOR PROCESSING IMAGE DATA

(71) Applicant: SICK AG, Waldkirch (DE)

(72) Inventors: Jean Stawiaski, Waldkirch (DE); Thorsten Falk, Waldkirch (DE); Johannes Rheinboldt, Waldkirch (DE)

(73) Assignee: SICk AG, Waldkirch (DE)

( * ) Notice: Subject to any disclaimer, the term of this patent is extended or adjusted under 35 U.S.C. 154(b) by 258 days.

(21) Appl. No.: 17/324,743

(22) Filed: May 19, 2021

(65) Prior Publication Data
US 2021/0368096 A1 Nov. 25, 2021

(30) Foreign Application Priority Data
May 25, 2020 (EP) .................................... 20176228

(51) Int. Cl.
*G06V 10/22* (2022.01)
*G06N 3/045* (2023.01)
(Continued)

(52) U.S. Cl.
CPC ........... *G06V 10/225* (2022.01); *G06N 3/045* (2023.01); *G06V 10/10* (2022.01); *G06V 10/454* (2022.01); *G06V 10/764* (2022.01); *G06V 10/82* (2022.01)

(58) Field of Classification Search
CPC .......... G06V 10/10; G06V 10/82; G06N 3/02; H04N 23/60
See application file for complete search history.

(56) References Cited

U.S. PATENT DOCUMENTS 9,594,983 B2 * 3/2017 Alattar ............... G06V 10/7753
9,858,496 B2 * 1/2018 Sun ......................... G06N 3/084
(Continued)

FOREIGN PATENT DOCUMENTS

CN 108921182 A 11/2018
EP 1365577 A1 11/2003
(Continued)

OTHER PUBLICATIONS https://arxiv.org/abs/1807.11886, Deep Dual Pyramid Network for Barcode Segmentation using Barcode-30k Database, Qijie Zhao, Feng Ni, Yang Song, Yongtao Wang, Zhi Tang, Jul. 31, 2018 (Year: 2018).*

(Continued)

*Primary Examiner* — Daniel I Walsh
(74) *Attorney, Agent, or Firm* — Nath, Goldberg & Meyer; Jerald L. Meyer; Stanley N. Protigal

(57) ABSTRACT

A camera (10) comprising
an image sensor (24) for capturing image data with a plurality of pixels,
a first processing unit (30) for reading out the image data of the image sensor (24) in an image data stream comprising groups of adjacent pixels,
a second processing unit (32) for processing the image data, and a memory (34) for storing at least one of the image data and processing results from the image data,
wherein a neural network (38) is implemented on at least one of the first processing unit (30) and the second processing unit (32)
and wherein the first processing unit (30) is configured to already process groups of pixels with at least a first layer (42) of the neural network while further groups of the image data are still being read out from the image sensor (24).

21 Claims, 4 Drawing Sheets

(51) Int. Cl.
  *G06V 10/10* (2022.01)
  *G06V 10/44* (2022.01)
  *G06V 10/764* (2022.01)
  *G06V 10/82* (2022.01)

(56) References Cited

U.S. PATENT DOCUMENTS

| | | | | |
|---|---|---|---|---|
| 10,963,658 | B1* | 3/2021 | Bloch | G06V 30/186 |
| 10,984,378 | B1* | 4/2021 | Eckman | G06K 19/06131 |
| 11,080,498 | B1* | 8/2021 | Drzymala | H04N 23/54 |
| 11,176,454 | B2* | 11/2021 | Schüler | G06K 7/1413 |
| 11,199,853 | B1* | 12/2021 | Afrouzi | G05D 1/0246 |
| 11,232,554 | B1* | 1/2022 | Do | G06V 10/993 |
| 11,290,643 | B1* | 3/2022 | Tullis | G06V 10/82 |
| 11,399,198 | B1* | 7/2022 | Pourreza | H04N 19/513 |
| 11,481,751 | B1* | 10/2022 | Chaubard | G06V 10/82 |
| 11,508,037 | B2* | 11/2022 | Yang | G06N 3/045 |
| 11,593,637 | B2* | 2/2023 | Luo | G06N 3/045 |
| 2008/0310765 | A1* | 12/2008 | Reichenbach | G06V 10/22 |
| | | | | 382/312 |
| 2018/0046903 | A1* | 2/2018 | Yao | G06N 3/048 |
| 2018/0314250 | A1* | 11/2018 | Lewis | G06N 3/008 |
| 2019/0236801 | A1 | 8/2019 | Sekii | |
| 2019/0325068 | A1* | 10/2019 | Lai | G06F 16/951 |
| 2019/0325183 | A1* | 10/2019 | Tscherepanow | G06T 7/73 |
| 2019/0385004 | A1* | 12/2019 | Jiang | G06N 3/044 |
| 2020/0019947 | A1* | 1/2020 | Altuev | G07G 1/0045 |
| 2020/0111200 | A1* | 4/2020 | Li | G06N 3/045 |
| 2020/0175306 | A1* | 6/2020 | Onoro-Rubio | G06N 3/045 |
| 2020/0234402 | A1* | 7/2020 | Schwartz | G06T 5/002 |
| 2021/0042573 | A1* | 2/2021 | Krishnamoorthy | G06N 3/08 |
| 2021/0158533 | A1* | 5/2021 | Cui | G06T 7/11 |
| 2021/0272318 | A1* | 9/2021 | Conticello | G06N 3/045 |
| 2021/0279436 | A1* | 9/2021 | Barkan | G06K 7/1465 |
| 2021/0312217 | A1* | 10/2021 | Nater | G06K 7/1408 |
| 2021/0368096 | A1* | 11/2021 | Stawiaski | G06V 10/225 |
| 2021/0403024 | A1* | 12/2021 | Shih | B60W 50/14 |
| 2022/0036562 | A1* | 2/2022 | Wu | G05D 1/02 |
| 2022/0287676 | A1* | 9/2022 | Steines | A61B 6/102 |
| 2022/0309264 | A1* | 9/2022 | Yang | G06K 7/1413 |
| 2022/0375546 | A1* | 11/2022 | Huang | G06V 10/774 |
| 2023/0046642 | A1* | 2/2023 | Hung | G06F 15/7807 |
| 2023/0052553 | A1* | 2/2023 | Wang | G06V 10/28 |
| 2023/0054523 | A1* | 2/2023 | Dou | H04N 19/80 |
| 2023/0065252 | A1* | 3/2023 | Døssing | A63F 13/213 |
| 2023/0067841 | A1* | 3/2023 | Saharia | G06N 3/045 |
| 2023/0214630 | A1* | 7/2023 | Temple | G06N 3/08 |
| | | | | 706/15 |
| 2023/0267293 | A1* | 8/2023 | Schüler | G06K 7/1482 |
| | | | | 235/462.09 |
| 2023/0274453 | A1* | 8/2023 | Tang | G06T 3/40 |
| | | | | 348/42 |
| 2023/0281053 | A1* | 9/2023 | Kundu | H04L 41/0853 |
| | | | | 718/105 |
| 2023/0289545 | A1* | 9/2023 | Yamada | G06K 7/1417 |
| | | | | 235/462.1 |

FOREIGN PATENT DOCUMENTS

| | | |
|---|---|---|
| EP | 2003599 A1 | 12/2008 |
| EP | 2555160 B1 | 10/2013 |
| EP | 3009984 A1 | 4/2016 |
| EP | 3229169 A1 | 10/2017 |
| EP | 3428834 B1 | 6/2019 |
| JP | 2017187988 A | 10/2017 |
| JP | 2019133331 A | 8/2019 |
| WO | 2020038091 | 2/2020 |

OTHER PUBLICATIONS

Advances in Databases and Information Systems, Sep. 12, 2014, Springer International Publishing, (Year: 2014).*
https://ieeexplore.ieee.org/document/7577308 , A High Performance FPGA / based Accelerator for Large—Scale Convolutional Neural Networks,2016 26th International Conference on Field Programmable Logic and Applications (Fpl), IEEE,2016 , Jan. 2, 2009 (Year: 2009).*
Zhao, et al., "Deep Dual Pyramid Network for Barcode Segmentation using Barcode-30k Database", arXiv preprint arXiv:1807.11886 (2018).
Zeiler, et al., "Visualizing and Understanding Convolutional Networks", ECCV 2014, Part I, LNCS 8689, pp. 818-833 (2014).
Hansen, et al., "Real-Time Barcode Detection and Classification using Deep Learning", IJCCI (2017).
He, et al., "Deep Residual Learning for Image Recognition", arXiv:1512.03385 (2015).
Xiao, et al., "1D Barcode Detection via Integrated Deep-Learning and Geometric Approach", Applied Sciences 9.16 (2019).
Zharkov, et al., "Universal Barcode Detector via Semantic Segmentation", arXiv preprint arXiv:1906.06281 (2019).
Kuechao wei et al., TGPA: Tile-Grained Pipeline Architecture for Low Latency CNN Inference, 2018 IEEE/ACM International Conference on Computer-Aided Design (ICCAD), Nov. 5-8, 2018, San Diego, CA USA.
Huiman Li et al., A High Performance FPGA-based Accelerator for Large-Scale Convolutional Neural Networks, 2016 26th International Conference on Field Programmable Logic and Applications (FPL), Aug. 29-Sep. 2, 2016, INSPEC Accession No. 16342059, Lausanne, Switzerland.
Akito Takeki et al., Parallel Feature Pooling without Information Loss, IEICE Tech. Rep., Feb. 8, 2018, pp. 239-244, vol. 117, No. 432, IE2017-112, Hokkaido, Japan.

* cited by examiner

CAMERA AND METHOD FOR PROCESSING IMAGE DATA

FIELD

The invention relates to a camera and a method for processing image data with a neural network.

BACKGROUND

Cameras are used in a variety of ways, among others in industrial applications to automatically detect object properties, for example to inspect or measure objects. Images of the object are recorded and evaluated by image processing methods according to the task. Another application of cameras is the reading of codes. An image sensor is used to record objects bearing the codes, to identify the code areas in the images, and to decode them. Camera-based code readers can easily cope with code types other than one-dimensional bar codes having a two-dimensional structure like a matrix code and providing more information. The automatic text detection of printed addresses (OCR, Optical Character Recognition) or handwriting is also some kind of code reading in principle. Typical areas of application for code readers are supermarket checkouts, automatic package identification, sorting of postal items, baggage handling at airports, and other logistics applications.

A common detection situation is the mounting of a code reader or a camera for inspection or measurement applications above a conveyor belt. The camera takes images during the relative movement of the object stream on the conveyor belt and stores the acquired information or initiates further processing steps depending on the detected object properties. These processing steps may consist in further processing adapted to the specific object using a machine that acts on conveyed objects, or in a change of the object stream in that certain objects are removed from the object stream as part of a quality control, or in that the object stream is sorted into several partial object streams. A code reader identifies the objects for correct sorting or similar processing steps on the basis of the attached codes.

Thanks to advancements in camera and image sensor technology, the images to be processed are getting larger and larger. The immense amounts of data pose challenges to the limited computational capabilities and bandwidths for data output and data processing in a camera. A critical first step is finding and locating code regions, as this still needs to be done on the entire high-resolution image data. FPGAs (Field Programmable Gate Array) are used in the prior art for this segmentation, but also for further pre-processing to prepare image data.

EP 2 555 160 B1 finds areas of interest or code candidates in a preprocessing on an FPGA using a contrast measure. In EP 2 003 599 A1, a binary image is already generated while the image data is being read out, and in EP 1 365 577 A1, a compressed image is generated, for example in JPEG format. EP 3 009 984 A1 discloses an optical code detection system that determines a displacement vector for successive image acquisitions, indicating how an image area is displaced relative to the previous image. The displacement vector may be determined by correlating gray level profiles found in a segmentation, and the method for determining the displacement vector may be implemented on an FPGA.

To the extent that these approaches deal with segmentation, this is based on predefined criteria such as a contrast measure. However, this is prone to errors, since, for example, texts or periodic patterns are confused with codes, or codes in low-contrast areas are overlooked, and the like. Particularly in the case of difficult backgrounds, it can happen that the decoding process does not come up with a result in the available time window and has to be aborted in order to process the next image. The result is reading errors or unread codes that require time-consuming manual post-processing steps.

In principle, neural networks and in particular CNNs (Convolutional Neural Networks) that are trained to detect codes are very well suited to overcome these disadvantages. Approaches to this end are increasingly found in the literature in recent years.

In the paper Zhao, Qijie, et al, "Deep Dual Pyramid Network for Barcode Segmentation using Barcode-30k Database", arXiv preprint arXiv:1807.11886 (2018), a large dataset is synthesized and code segmentation by CNNs is performed. However, the exact network architecture and hardware implementation is not presented.

Xiao, Yunzhe, and Zhong Ming, "1 D Barcode Detection via Integrated Deep-Learning and Geometric Approach," Applied Sciences 9.16 (2019): 3268 claim at least 5% improvement in barcode localization performance over previous approaches without the need to manually adjust parameters.

Hansen, Daniel Kold, et al, "Real-Time Barcode Detection and Classification using Deep Learning," IJCCI. 2017 detect code regions including a rotation in real time using an Intel i5-6600 3.30 GHz and an Nvidia GeForce GTX 1080.

Zharkov, Andrey; Zagaynov, Ivan, Universal Barcode Detector via Semantic Segmentation, arXiv preprint arXiv: 1906.06281, 2019 detect barcodes and identify the code type in a CPU environment.

However, the processing of a CNN requires completely different computing capacities than the conventional preprocessing chains mentioned above as examples. This is not feasible with embedded hardware, in particular under real-time conditions or at any rate within limited time windows, for example due to the conveyor movement of the objects to be detected. A conventional solution is to use specialized hardware or co-processors, such as NPUs (Neural Processing Units) or GPUs (Graphics Processing Units). However, such components are usually not available in an embedded architecture either.

U.S. Pat. No. 9,858,496 B2 discusses object detection and classification in images using special neural networks, namely RPNs (region proposal networks). In order to get more computing power, various devices including ASICs (Application-Specific Integrated Circuits) or FPGAs can be used. However, this has no particular relation to code reading.

US 2018/0046903 A1 quite generally proposes a heterogeneous architecture with a CPU and an FPGA to accelerate the processing of a CNN. However, computer vision is mentioned only as background, a more detailed implementation or the application to code reading is not given.

He, Kaiming; Zhang, Xiangyu; Ren, Shaoqing; Sun, Jian (2015 Dec. 10), "Deep Residual Learning for Image Recognition", arXiv:1512.03385 address the problem that deep neural networks with numerous layers require a tremendous amount of training. This can be improved by so-called "residual connections", i.e. connections that skip layers. This is a very general technique without reference to code reading.

EP 3 428 834 B1 uses a classical decoder that uses methods without machine learning for the training of a machine learning classifier or more specifically a neural network. However, this document does not deal with preprocessing or locating code regions in any detail.

No previously known approach has succeeded in suitably reducing or distributing the tremendous computational load required to process high-resolution images by CNNs, so that hardware devices with low to moderate performance could also be used.

SUMMARY

It is therefore an object of the invention to improve the processing of images with neural networks, in particular for code reading.

This object is satisfied by a camera comprising an image sensor for capturing image data with a plurality of pixels, a first processing unit for reading out the image data of the image sensor in an image data stream comprising groups of adjacent pixels, a second processing unit for processing the image data, and a memory for storing at least one of the image data and processing results from the image data, wherein a neural network is implemented on at least one of the first processing unit and the second processing unit and wherein the first processing unit is configured to already process groups of pixels with at least a first layer of the neural network while further groups of the image data are still being read out from the image sensor.

The object is also satisfied by a method for processing image data with a plurality of pixels, comprising the steps of reading out the image data from an image sensor in an image data stream of groups of adjacent pixels using a first processing unit, processing the image data by means of a neural network implemented on at least one of the first processing unit and a second processing unit, and storing at least one of the image data and processing results in a memory, wherein groups of pixels are already processed by the first processing unit with at least a first layer of the neural network while further groups of image data are still being read out from the image sensor.

The camera preferably is configured as a camera-based code reader. Throughout this specification, the terms preferably or preferred refer to advantageous, but completely optional features. An image sensor acquires image data with a plurality of pixels, typically in a high-resolution of several megapixels. A first processing unit reads out the image data of the image sensor, i.e. the preferably high-resolution raw image. The readout is done as an image data stream (streaming) in groups of neighboring pixels. The camera also comprises a second processing unit for processing image data that preferably is not directly connected to the image sensor, and a memory for image data and processing results. Processing results are, for example, processed image data and features and characteristics obtained therefrom.

The image data is processed at least in part by a neural network implemented on the first processing unit, the second processing unit, or both processing units. The neural network preferably is a CNN (Convolutional Neural Network) and is often referred to as such in the following. In prior art implementations, the first processing unit streams the image data into memory, possibly after preprocessing with classical methods. Only subsequently, the processing is carried out by a neural network, whereby a distributed load on the first and second processing unit is conceivable.

The invention starts from the basic idea of already processing the image data in a neural network during image readout or image acquisition. To that end, at least the first layer of the neural network is implemented on the first processing unit, and this first layer is already supplied with groups of pixels while further groups of image data are still being read out from or acquired by the image sensor. A second and further layers of the neural network can also be implemented on the first processing unit (early layers), which then start their processing as soon as the previous layer has generated sufficient intermediate results. The neural network thus begins or continues its processing as soon as enough groups of image data have been read out for the next processing step. In parallel, or at least for practical purposes parallel to this processing, still further groups of image data are read out or acquired, until at some point the image is complete and only the remaining processing steps for the latest image data need to be added. The neural network operates "on the fly", or already during the streaming of an image.

The invention has the advantage that the processing is distributed to several processing units in a particularly favorable manner. Heterogeneous hardware architectures are particularly suitable for this purpose. Due to the early and fast processing of at least the first layer already during the readout or acquisition of the image data, the intermediate results or features of the at least first layer are available very quickly and even after constant processing time. This enables processing with neural networks even on systems with limited hardware resources, in particular with embedded hardware. The task distribution and implementation according to the invention also solves another problem not addressed in the documents discussed in the introduction, namely that an enormous bandwidth is required for data transmission between the processing units that process a neural network. Even with sufficient computing capacity, this could otherwise become a bottleneck that would prevent processing under the required time constraints.

The group of adjacent pixels preferably is an image line or a part thereof, thus image lines are already processed by the first layer while further image lines are still being read out. The image is thus read out or streamed from the image sensor line by line, and the processing is line-oriented. As soon as enough image lines have been read out for the convolution kernel of the first layer, the next processing step can take place. For this purpose, the first processing unit preferably has an image buffer where a corresponding number of image lines are temporarily stored on a rolling basis. In principle, image columns can also be used in the same way instead of image lines. This is merely understood as a difference in the definition of the coordinates and is not distinguished in any further detail.

The first processing unit preferably comprises a field programmable gate array (FPGA) and/or the second processing unit preferably comprises a microprocessor. An FPGA is particularly suitable for real-time processing of large amounts of data with comparatively simple individual computing operations, such as those involved in the matrix operations of discrete convolution in the at least first layer of the neural network. A CPU, on the other hand, is much more flexible and capable of more complex computational steps on its own, and this is advantageous for further processing.

The neural network preferably is configured for a segmentation of the image data for locating at least one of regions of interest and code regions. This task of identifying and locating code regions or code candidates, which prepares the actual code reading, must operate on the high-resolution images and therefore cope with very large amounts of data. By already performing the processing during the readout or "on the fly" according to the invention, the processing time is significantly reduced and thus manageable. In addition, only the processing results about the located code regions need to be output. An additional data transfer for input data of the first processing unit is not necessary, except for the raw image data, which, however, needs to be read out once from the image sensor in any case.

The at least first layer of the neural network on the first processing unit preferably generates a feature map which is stored as a processing result in the memory. A feature map is the result of a respective layer of a CNN. The feature map of the first layer, or in case that several layers are implemented on the first processing unit, that of the last of these layers, is stored for further processing, in particular by the second processing unit.

Further layers of the CNN, another CNN or even a classical method can then make use of the feature map.

The feature map preferably comprises a probability map including probability information about locations of codes in the image data. This is a possible output format for the result of a segmentation by codes. From this probability map, it is possible to very quickly determine which regions are most likely to have successful read attempts in the limited decoding time. The probability map can contain more than one piece of information per location, for example a probability for each of different code types, such as 1D codes and 2D codes, or further differentiated according to different 1D and 2D code types.

The feature map preferably has a lower resolution than the image data of the image sensor. Only the first processing unit or the at least first layer of the neural network should preferably have to operate with the high-resolution original image data. In the course of further processing, the resolution is reduced. The feature map to be stored already contains a significantly reduced amount of data. This is particularly true for the probability map, because it is not necessary to specify for each individual pixel whether it belongs to a code, but only for regions above a certain size. For example, an image can be divided into tiles of n×m pixels, and for each tile a feature or, if the features are to differentiate further, a group of features is stored in the feature map.

The first processing unit preferably comprises at least a first buffer memory for temporarily storing processing results of the at least first layer. The groups of neighboring pixels are preferably initially written into an image buffer after readout. The first buffer memory is not intended for the original image data, but for the processing results of the first layer of the neural network. The size of the buffer memory is preferably just enough to store enough processing results to feed the following processing step of the subsequent layer.

If only the first layer is implemented on the first processing unit, then a first buffer memory for one line of the feature map is sufficient, which in each case is transferred to the memory and refilled. If a second layer is implemented on the first processing unit, then the size of the first buffer memory is preferably based on the size of the convolution kernels of the second layer. A second buffer memory is provided for the processing results of the second layer whose configuration is selected accordingly, i.e. preferably only a capacity for one line if there is no subsequent third layer on the first processing unit, or otherwise adapted to its convolution kernels. This can be continued in a similar way with third and further layers and buffer memories. Image buffers and buffer memories are preferably used in a rolling manner according to the principle of a FIFO (First In, First Out), so that the currently required image data and intermediate results are always available.

At least one neural network layer implemented on the first processing unit preferably comprises a step size greater than one, i.e. whose convolution kernel is shifted by more than one pixel at a time. A step size of several pixels (large strides) ensures that the resolution of the output data is rapidly reduced compared to the input data of the layer. Therefore, this measure is preferably already applied in the first layer, but may also affect another, several or all layers on the first processing unit.

At least one neural network layer implemented on the first processing unit preferably comprises a dilated convolution kernel that processes pixels that are not directly adjacent. Such a kind of convolution kernel operates on pixels that are spaced apart from each other by $i>1$ pixels. This extends the respective detection range. Again, this preferably concerns the first layer and is alternatively conceivable for any layers of the first processing unit.

The first processing unit preferably is configured to store the read-out image data in the memory, in particular after preprocessing. According to the invention, the image data are fed to the first layer of the neural network during readout. According to this embodiment, they are also stored in the memory in an additional path of the first processing unit. Thus, the original high-resolution image is separately available for further processing, in particular to a decoder of the second processing unit. An image buffer of the first layer can be shared for this purpose in order to store larger data blocks of the image in the memory.

It is conceivable to perform preprocessing steps in the additional path with classical methods or learning methods, for example an image compression, a brightness correction, generation of a binary image and the like. The result of this kind of preprocessing is not to be confused with that of the at least first layer of the neural network on the first processing unit, it is additional data.

Further layers of the neural network and/or a further neural network preferably are implemented on the second processing unit in order to further process the image data and/or the processing results of the first processing unit. Accordingly, the neural network is divided into early layers on the first processing unit and further layers on the second processing unit. The further layers can alternatively be understood as a separate neural network, which is ultimately only a linguistic difference. The further layers and the further neural network of the second processing unit, respectively, operate on the basis of the feature map stored in the memory by the early layers and, if applicable, the additionally stored high-resolution image. This processing no longer is carried out "on the fly" during readout, acquisition or streaming, although processing could be started as soon as the required data has been stored in the memory.

The further layers are and/or the further neural network preferably is configured for reading codes on the basis of the processing results of the at least first layer. In particular, the segmentation results of the early layers on the first processing unit are used, for example in the form of a probability map, to find code regions in the high-resolution image additionally stored in the memory. These code regions are then used to make reading attempts of the code content by the further layers or the further neural network.

The second processing unit preferably comprises a classical decoder without neural network for reading codes. Classical means that no learning methods and in particular no neural network is used. The classical decoder uses the results of the early layers on the first processing unit, in particular a probability map of a segmentation by code regions. It is not unusual to try to read a code with different decoders. Therefore, it is also conceivable to process code regions in parallel or successively both with further layers of a neural network or a further neural network, respectively, and with at least one classical decoder.

At least two neural networks preferably are implemented on the second processing unit, each of which further processes processing results of the first processing unit. These two neural networks can be regarded as later layers of the early layers on the first processing unit, those early layers being frozen, so to speak, after their training and then continued in the two neural networks in different ways. Thus, the processing results of the early layers of the first processing unit are reused several times, or are further processed with different goals depending on the situation. For example, the two neural networks read different types of code, or at least one of the neural networks has a completely different purpose.

The camera preferably comprises at least one additional processing unit for processing steps of the neural network. There is thus a third processing unit, or there are even more processing units. This allows a further improved distribution of the computing load. The additional processing unit preferably comprises at least one of an NPU (Neural Processing Unit) and a GPU (Graphics Processing Unit). These kinds of components are usually not available on embedded hardware. However, it is conceivable to upgrade, and in that case much more powerful neural networks can be implemented.

The method according to the invention can be modified in a similar manner and shows similar advantages. Further advantageous features are described in an exemplary, but non-limiting manner in the dependent claims following the independent claims.

BRIEF DESCRIPTION OF THE DRAWING

The invention will be explained in the following also with respect to further advantages and features with reference to exemplary embodiments and the enclosed drawing. The Figures of the drawing show in.

DETAILED DESCRIPTION

Figure 1:
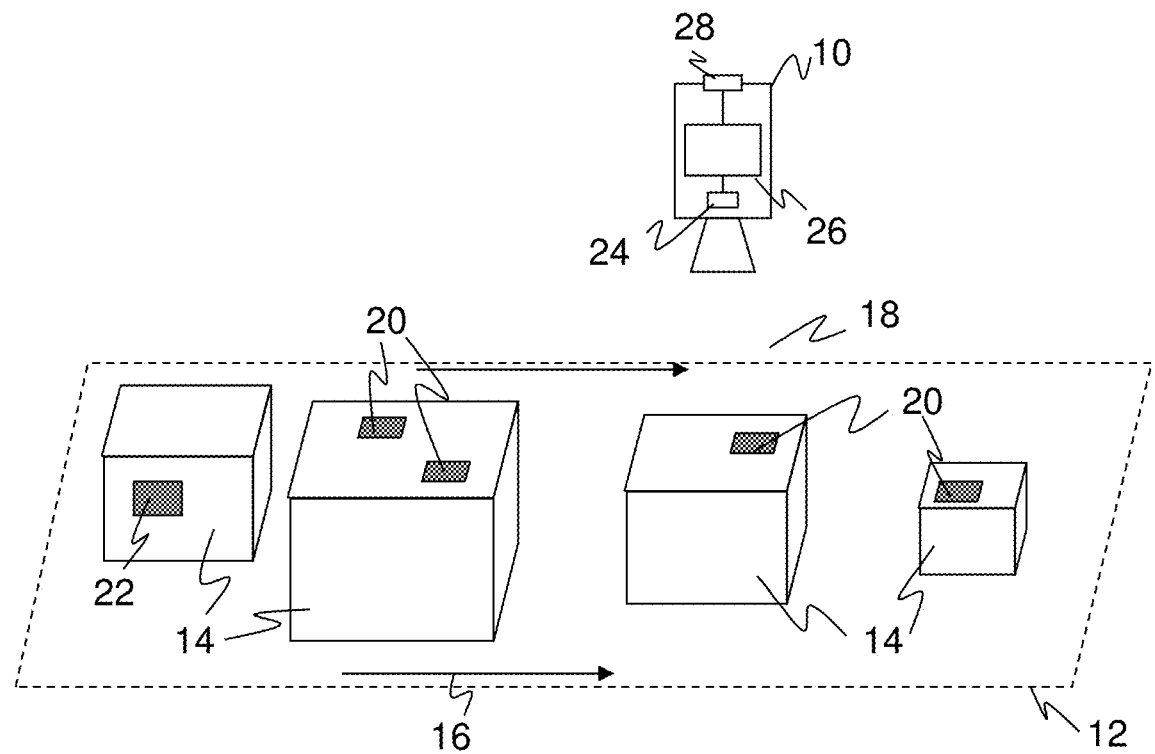
FIG. 1 a schematic overview of the exemplary installation of a camera above a conveyor belt.

FIG. 1 shows a camera 10 mounted above a conveyor belt 12 that conveys objects 14 through the detection area 18 of the camera 10, as indicated by the arrow 16. In this application example, the objects 14 have codes 20 on their outer surfaces that are detected and evaluated by the camera 10.

The codes 20 can only be detected by the camera 10 if they are attached to the upper side or are at least visible from above. Therefore, in deviation from the illustration in FIG. 1, a plurality of cameras 10 can be mounted from different directions for reading a code 22 attached to the side or bottom, for example, in order to enable so-called omni-reading from all directions. In practice, the arrangement of the multiple cameras 10 to form a reading system is usually a reading tunnel. This stationary application of the camera 10 on a conveyor belt is very common in practice. However, the invention relates to the processing of image data and the camera 10 itself, respectively, so that this example should not be understood as restrictive. Instead of code reading or a camera 10 configured as a camera-based code reader, other image evaluation tasks are also possible for the camera 10, for example for measuring or inspecting objects 14.

The camera 10 uses an image sensor 24 to acquire image data of the conveyed objects 14 and the codes 20, which are further processed by an evaluation unit 26 using image evaluation and decoding methods. The evaluation unit 26 preferably is implemented in embedded hardware and has a plurality of evaluation modules. The configuration of the evaluation unit 26 and its processing of the image data will be explained in more detail later with reference to FIGS. 3 to 7. The camera 10 outputs information, such as codes that have been read or image data, via an interface 28.

Figure 2A:
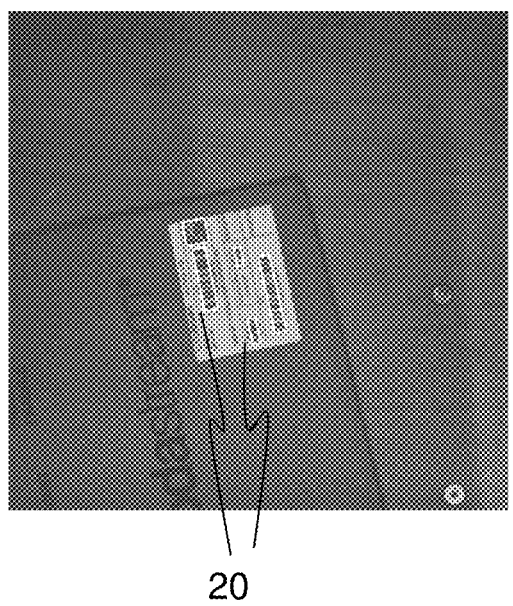
FIG. 2a-b example images with codes to be read against a varying background.
Figure 2B:
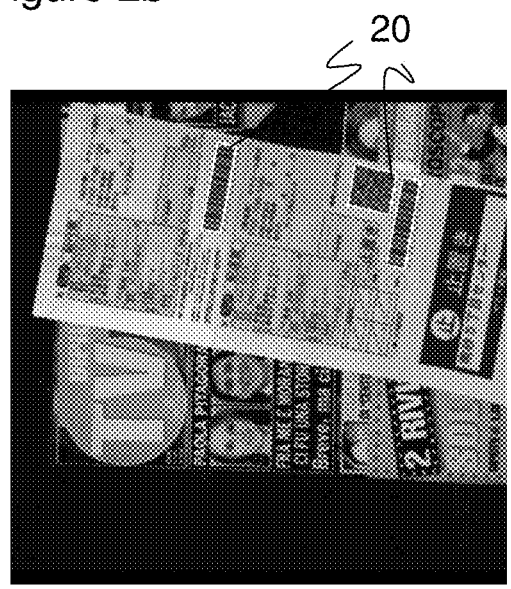

FIGS. 2a-b show two example images with codes 20 against different backgrounds. A first step in reading codes 20 is segmentation, which is used to identify and localize code candidates. The result of a successful segmentation is highlighted with white frames in FIG. 2a-b. Predefined criteria do not reliably lead to success. With a neural network, the recognition rate against different backgrounds can be improved. The segmentation of codes 20 is an important application example. However, other image features can also be found by neural networks with the architecture now described.

Figure 3:
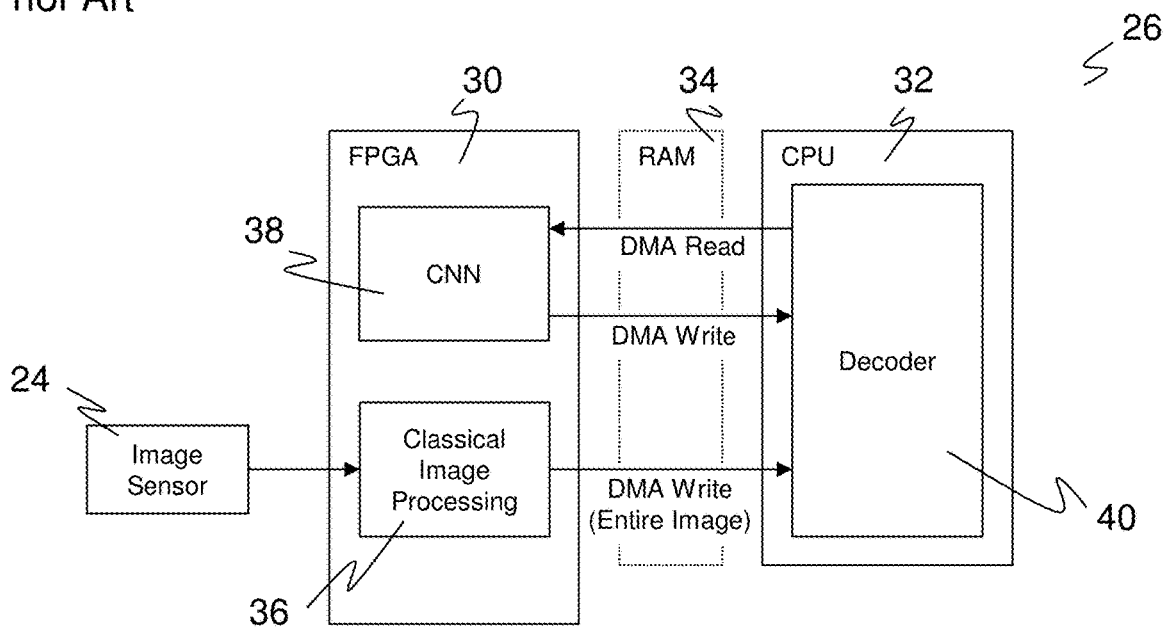
FIG. 3 a schematic representation of the conventional processing of image data using a neural network.

FIG. 3 shows a conventional processing of an image data stream from the image sensor 24 by an evaluation unit 26 comprising an FPGA 30, a CPU 32 and a memory 34. The image data is read out by the FPGA 30 and written to the memory 34 as a complete high-resolution image. Meanwhile, a classical pre-processing unit 36 may already process the image data stream, for example applying filters to the image or even performing segmentation. However, this segmentation is based on predetermined criteria and classical methods without machine learning, and therefore there is still a rather high error rate of unrecognized codes 20 or, conversely, of areas that were falsely recognized as codes 20.

A neural network 38 used to process the image is also implemented on the FPGA 30. It accesses the memory 34 to read the image and writes the processing results of the neural network 38 back to the memory 34. Accordingly, the neural network 38 expects to be able to access the entire image, so image acquisition by the pre-processing unit 36 must be completed before the neural network begins its processing. The neural network 38 does preliminary evaluation for a decoder 40 of the CPU 32 that is used to read codes 20, or possibly already reads the codes 20 itself, so that the decoder 40 is assigned more managerial tasks.

This method has several disadvantages. Firstly, time is lost because the processing of the neural network 38 cannot begin until an image is fully acquired. Furthermore, the FPGA 38 must combine the two tasks of reading out or preprocessing 36 and the neural network 38 with its limited computing resources. This can be solved by a particularly powerful FPGA 30, an additional FPGA, or some other co-processor such as a GPU, NPU, or DSP, but this additional effort is intended to be avoided.

In addition, this does not solve the further disadvantage, which also arises in the situation of FIG. 3, that a quite considerable data exchange must take place, which requires appropriate bandwidths or slows down the system. This is because the entire image must first be read out by the FPGA 30 and written to the memory 34. Then, after the image has been completely transferred, it must be transferred again from the memory to the FPGA 30 or the other responsible component and there be processed by the neural network 38, whereupon the processing results are again stored in the memory 34. This is a considerable communication bottleneck in a real-time system, and already with a limited processing time window, for example until the next object 14 is moved into the detection area 18 in the application according to FIG. 1.

Figure 4:
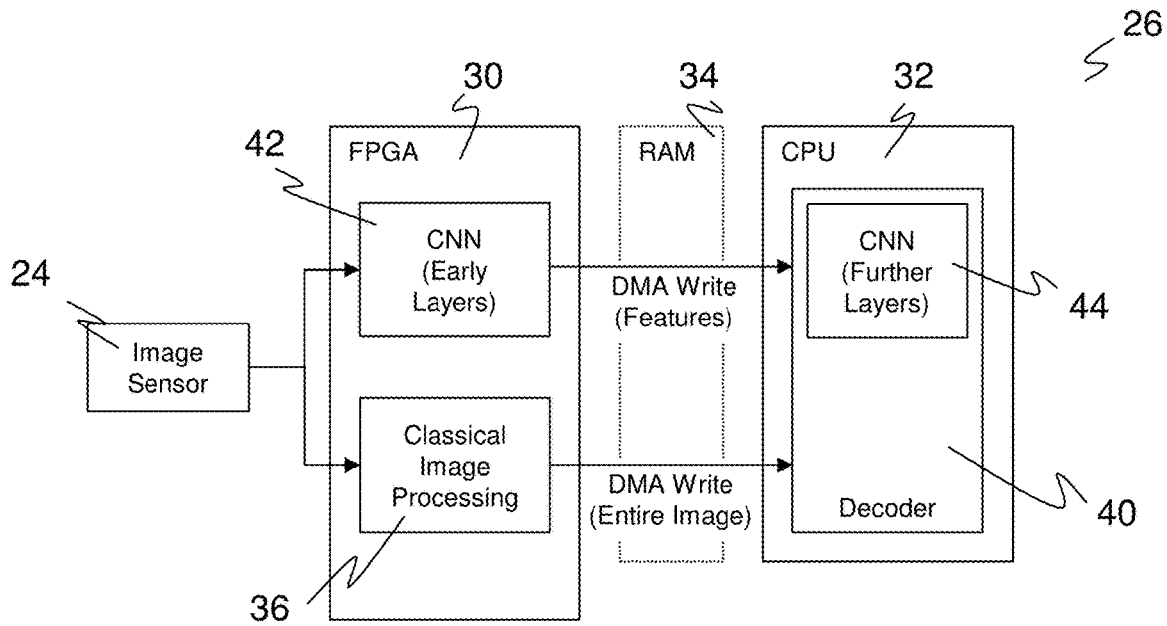
FIG. 4 a schematic representation of the processing of image data using a neural network already during readout or streaming of the image data in an embodiment of the invention.

FIG. 4 shows the processing of the image data stream from the image sensor 24 by the evaluation unit 26 in an embodiment of the invention. In principle, comparable hardware with an FPGA 30, a CPU 32 and a memory 34 as in FIG. 3 may be used, but now be used differently. The FPGA 30 is representative of a hardware component of a first processing unit, which preferably is capable of real-time processing and in any case capable of handling the amounts of data from the image sensor 24. Correspondingly, the CPU 32 represents a second processing unit that is flexibly programmable but does not necessarily have a suitable interface for reading out image data with megapixel resolution at usual frame rates. The CPU 32 accesses the data provided by the FPGA 30 in the memory 34 to read the codes 20 with its decoder 40.

The channel of the classical preprocessing 36, used by the FPGA 30 to assemble the image data into a complete image and to store it in the memory 34, preferably remains. This enables the decoder 40 to access the full, high-resolution image. Preprocessing steps using classical methods are conceivable.

However, according to the invention, the processing using a neural network is organized differently. The early layers 42 of the neural network are implemented on the FPGA 30. This can also be only the first layer. Further layers 44 are implemented on the CPU 32. These further layers 44 could also be considered as a separate neural network that uses the processing result of the early layers 42 as input data. It would also be conceivable that the decoder 40 no longer operates using a neural network, but using classical methods.

The early layers 42 of the neural network already operate on the incoming image data stream while further image data still is being read out. The processing results of the early layers 42, strictly speaking the last of these early layers 42, are stored in the memory 34. The detour of the data via the memory 34 until the processing in the neural network can start is eliminated. The neural network according to the invention, or its first layer, does not expect a complete image, but already processes the partial image data currently read out. This also eliminates the communication bottleneck, because it is no longer necessary to read back the entire image into the FPGA 30. Memory accesses are only required to store the processing results of the early layers 42 piece by piece, and optionally to piecewise store the complete image in parallel via the classical preprocessing 36.

Figure 5:
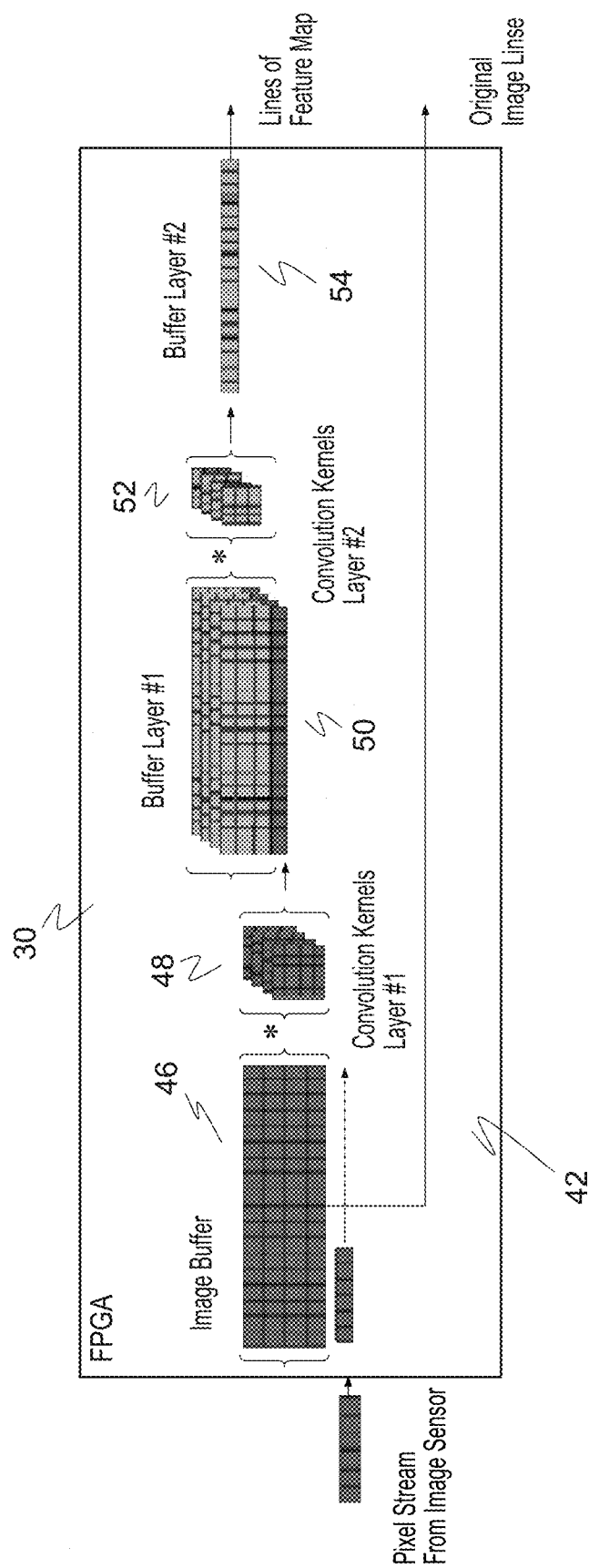
FIG. 5 an exemplary representation of the early layers of a neural network for processing image data already during readout.

FIG. 5 schematically shows the early layers 42 on the FPGA 30 in order to explain the processing by the neural network already during the readout of the image data in more detail. First, some technical terms shall briefly be introduced.

The preferred neural network is a CNN (Convolutional Neural Network), which is a kind of deep neural network particularly suitable for image processing. A CNN performs a series of discrete convolutions, each followed by a non-linear activation function. A respective combination of discrete convolution and activation function forms a layer of the CNN. The output of a layer is a feature map.

The individual discrete convolutions are implemented by matrix operations with convolution kernels or convolution matrices. The size of a convolution kernel is denoted by [N, N, C1, C2], where [N, N] are the spatial dimensions, C1 is the number of channels of input data, and C2 is the number of channels of output data. When the input data comprises only one channel, as in the case of a gray-scale image, the size of the convolution kernel becomes [N, N, 1, C2] or [N, N, C] for short. The size of the convolution kernels is dictated by the architecture of the CNN, and the values in the matrix are learned when the CNN is trained.

In FIG. 5, the processing in the shown early layers 42 on the FPGA 30, here exemplarily two layers, proceeds from left to right. Pixels from the image sensor 24 are read out as input data. This image data arrives as an image data stream of adjacent pixels, preferably as image lines. The pixels read out are temporarily stored in an image buffer 46, so that it is irrelevant how many adjacent pixels are received per readout operation. As soon as sufficient image lines are stored in the image buffer 46, processing by the first layer can start, and the first output line can be calculated by discrete convolution or matrix operations of the stored image lines and the first convolution kernels 48 of the first layer. The individual computation is similar to a common image filtering operation with a filter kernel, but multiple output images are produced in parallel, namely one output image per filter kernel. Furthermore, the terminology is different, it is not an actual output image, but a feature map, and this will generally not show any optical enhancement, but will be modified according to the learned weights of the convolution kernels.

The first convolution kernels 48 have the size [N1, N1, C1], since the input image in this example is assumed to be a gray-scale image with only one channel. According to the spatial dimensions N1, a discrete convolution requires N1 image lines. The height of the image buffer 46 accordingly is given by the height N1 of the first convolution kernels 48, and the width is given by the image lines. As soon as the first layer has processed the first N1 image lines, the first image line is no longer needed because the second output line is calculated from the image lines 2 . . . N1+1. The image buffer 46 is therefore preferably used in a rolling manner according to the FIFO principle. The image buffer 46 may additionally hold a certain reserve of one or a few image lines for delays between readout from the image sensor 24 and further processing of the first layer.

The output lines are collected in a first buffer 50 of the first layer. In an alternative embodiment where the early layers 42 comprise nothing but the first layer, a first buffer 50 for only one output line is sufficient, which is transferred to memory 34 when complete. In the two-layer embodiment of FIG. 5, the first buffer 50 collects output lines for processing the second layer.

The second filter kernels 52 of the second layer have a size [N2, N2, C1, C2]. The first layer has generated channels of its output feature map from the single-channel grayscale image C1, and the spatial dimensions N2 of the second filter kernels 52 are basically independent of the spatial dimensions N1 of the first filter kernels 48. In other aspects, the processing in the second layer is analogous to the first layer. Thus, as soon as N2 lines are available in the first buffer 50, the calculation of an output line of the second layer can take place. The first buffer 50 should therefore be able to temporarily store at least N2 output lines of the first layer, and like the image buffer, the first buffer 50 is also preferably used in a rolling manner.

A second buffer 54 of the second layer holds only the respective most recently computed output line of the second layer. The completed output lines are part of the feature map representing the processing result of the early layers 42 on the FPGA 30, and are transferred to the memory 34 piece by piece. Of course, alternatively, multiple output lines may be temporarily stored before the FPGA stores them in the memory 34.

Deviating from what is shown in FIG. 5, a third and further layers of early layers 42 may be implemented on the FPGA 30, in which case third filter kernels, a third buffer, and possibly further filter kernels and buffers are provided.

In addition to the feature map, the FPGA 30 preferably stores the original image lines in the memory 34 so that the original image is available in further processing by the CPU 32 and the decoder 40. A classical preprocessing can additionally be carried out, possibly even a preprocessing with a further neural network. The latter does not aim at also segmenting the image again or extracting other features, but at a processing corresponding to the classical preprocessing.

The architecture of the CNN and its early layers 42 in FIG. 5 is simplified. In general, a relatively small CNN is sufficient for code reading or code segmentation, i.e. it does not have too many layers. Nevertheless, it has already been pointed out that two layers on the FPGA 30 are only to be understood as an example. In some embodiments, further layers 44 on the CPU 32 may also be added, that operate on the resulting feature map from the memory 34. The positioning of the dividing line between layers 42 implemented on the FPGA 30 and layers 44 implemented on the CPU 32 is a design choice. A preferred embodiment implements as many layers 42 on the FPGA 30 as its computational and memory capabilities permit.

Of the layers of the CNN, FIG. 5 shows only the convolutional kernels 48, 52. In addition, each layer preferably has typical elements such as a normalization and a non-linear activation function. There are a number of other design options for the CNN that are preferably, but not necessarily, implemented individually or in combination: Fast forward connections (residual connections), following the paper of He et al. cited in the introduction, may be provided to accelerate training, which will be discussed later. The CNN may be a fully convolutional network without having fully connected layers. In other words, the resolution of the feature maps decreases from layer to layer. To speed up the computations, the number of output channels of the layers may be limited to at most 1,000. In the first layers, filter kernels with step sizes not equal to one ("large strides") may be used so that the resolution decreases rapidly. Dilated convolution kernels may extend the respective detection region. Finally, the calculation may be optimized by separable convolution kernels, in particular depthwise separable convolution kernels.

By means of on-the-fly or pipelined processing of the early layers 42 while still reading out additional image data, the computational load can be distributed between the FPGA 30 and the CPU 32, while at the same time reducing data transfer by orders of magnitude. This allows the CNN to be implemented on hardware with moderate performance, particularly embedded hardware. These hardware requirements are met by available cameras 10, while bandwidth of data transfer and computing power are not sufficient for the processing of entire high-resolution images from memory 34 with a CNN, as explained in connection with FIG. 3, at least not in the time windows required in some applications such as in FIG. 1.

In a preferred application of the camera 10 as a code reader, the task of the CNN is to locate codes 20 of predetermined types. The output feature map in this case may, for example, be a probability map of where codes 20 of particular code types are probably located in the captured image, such as 1D codes and 2D codes or further differentiated code types. The probability map has as many channels as the number of code types to be distinguished. The resolution of the probability map is preferably much lower than that of the high-resolution input image. Then, the input image is divided into a kind of image tiles, and there is a probability value for the presence of a code 20 per image tile and not per individual pixel.

Before the CNN can be used, it must be taught or trained. This requires suitable training data. Usually, supervised learning is performed, where the correct expected results are specified. The training data are annotated or labeled accordingly. They must cover a wide range of variability so that the CNN can later cope flexibly with application situations, and thus manual annotation is very costly. Therefore a training dataset preferably is annotated by hand only as a starting point. Other training images are generated synthetically, these are already annotated by their origin. From this base set, numerous other annotated training images can be obtained by simulated effects.

This results in a longer, but still not exhaustive list of how training images can be generated or modified: Codes with random content, different code types (EAN, Code 128, Code 39, Datamatrix, PDF, . . . ), codes with random polarity or random quiet zones, incomplete codes, codes of different module width and height, codes having different poses and perspective distortions, printed and embossed codes (DPM, direct part marking), a plurality of different codes in the same image. Change effects that do not affect the code but the image are, for example, random noise (Gaussian, Laplace, homogeneous, Perlin), blur effects, non-linear deformations, random background textures (paper, cardboard, wood, plastic, metal, . . . ), texts of different fonts and font sizes, and lighting effects (uniform and non-uniform, spots, . . . ).

After training, some post-processing steps can be applied to optimize the later processing time. The learned weights in the discrete convolution kernels may be rescaled with batch normalization coefficients from the training. Furthermore, the weights are preferably quantized for the FPGA 30 and/or the CPU 32, for example to 8 bits or 16 bits.

Figure 6:
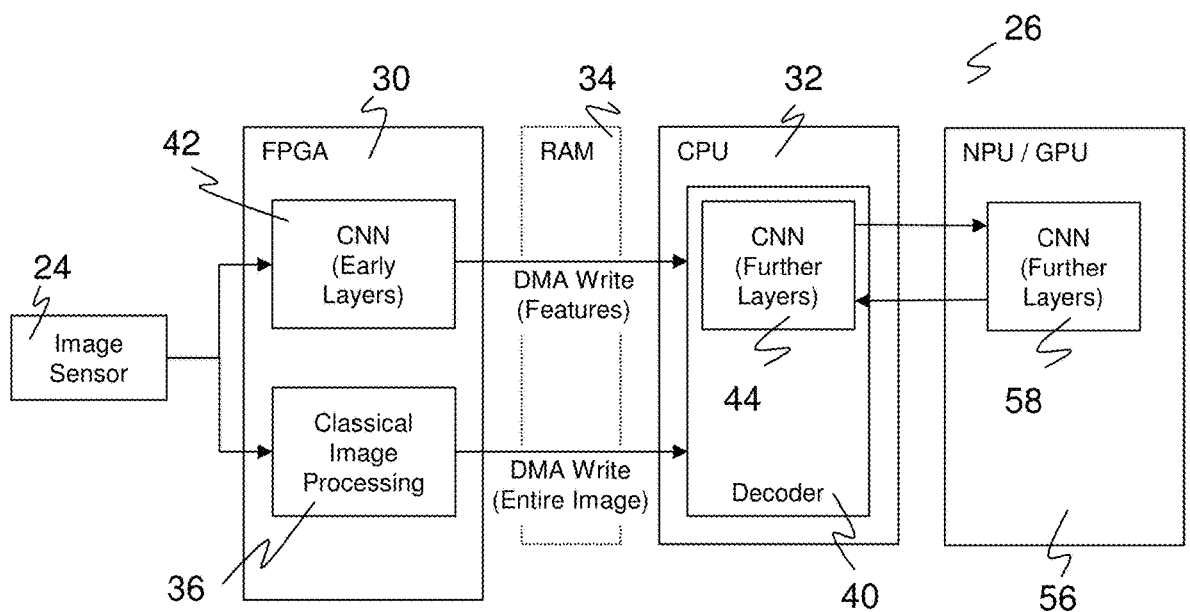
FIG. 6 a schematic representation of the processing of image data using a neural network already during the readout of the image data in another embodiment of the invention having an additional processing unit.

FIG. 6 shows the processing of the image data stream from the image sensor 24 by the evaluation unit 26 in another embodiment of the invention. In contrast to FIG. 4, at least one additional hardware component 56 of the evaluation unit 26 is provided. This preferably is a component particularly suitable for processing CNNs, such as an NPU (Neural Processing Unit) or a GPU (Graphics Processing Unit). However, it is also conceivable that the additional hardware component 56 is a different type of digital component, in particular another FPGA or another CPU. Due to the architecture according to the invention and the division of the CNN into early layers 42 that already process incoming image data during readout or streaming, an additional hardware component 56 is not required, but it can accelerate the processing, or a more complex CNN can be used. In the embodiment of FIG. 6, some further layers 58 of the CNN are outsourced to the additional hardware component 56. Alternatively, the further layers 44 are completely outsourced from the CPU 32, or the additional hardware component 56 processes at least one separate CNN for further tasks. Separate access of the additional hardware device 56 to the memory 34 may be provided.

Figure 7:
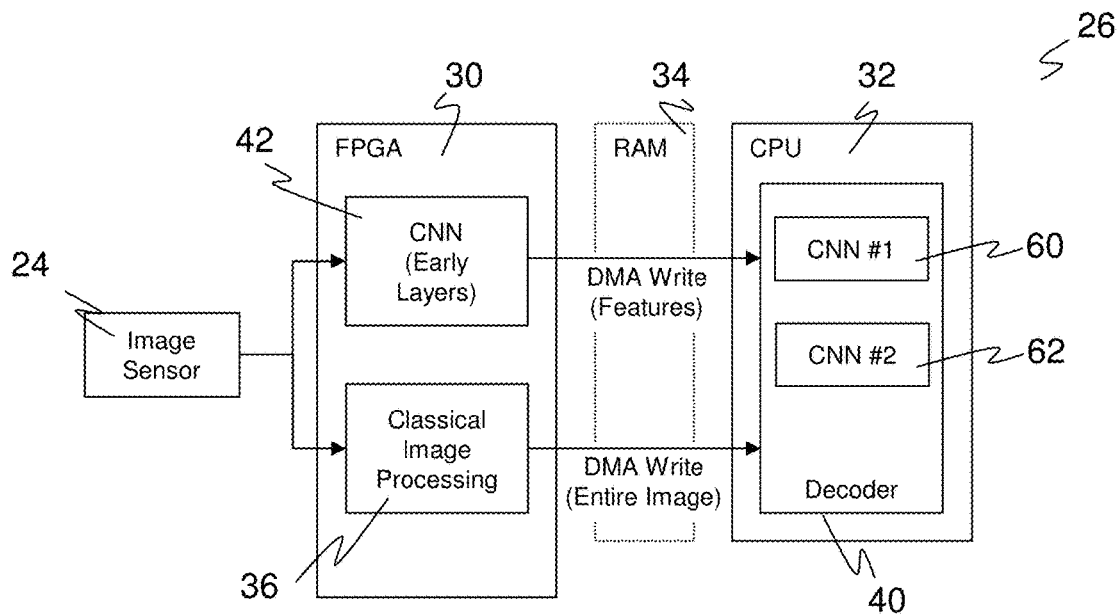
FIG. 7 a schematic representation of the processing of image data using a neural network already during the readout of the image data in another embodiment of the invention, wherein the results of the early layers are used by several neural networks.

FIG. 7 shows the processing of the image data stream from the image sensor 24 by the evaluation unit 26 in another embodiment of the invention. Two CNNs 60, 62 are now provided, accessing the feature map of the early layers 42. One of the CNNs 60, 62 may correspond to the further layers 44 in the other embodiments. Thus, two different CNNs 60, 62 are created, for example to read different types of codes, but they match in their first part of the early layers 4. In one embodiment, the achieved training state of the early layers 42 is frozen and used as a starting point for the subsequent, differing training of the CNNs 60, 62. In another embodiment, the early layers 42 are included in the extended training, thus are still allowed to change during the respective training of the CNNs 60, 62. It is also conceivable that a classical decoding method of the CPU 32 uses the feature map of the early layers 42 to find the code regions and thus replaces or supplements the further layers 44 and the CNNs 60, 62, respectively. Incidentally, this applies not only to the embodiment according to FIG. 7, but also to the other embodiments.

The invention claimed is:

1. A camera (10) comprising:
an image sensor (24) for capturing image data with a plurality of pixels, a first processing unit (30) for reading out the image data of the image sensor (24) in an image data stream comprising groups of adjacent pixels;
a second processing unit (32) for processing the image data; and
a memory (34) for storing at least one of the image data and processing results from the image data,
wherein a neural network (38) comprising a Convolutional Neural Network (CNN) is implemented on at least one of the first processing unit (30) and the second processing unit (32),
wherein the first processing unit (30) is configured to have started processing groups of pixels with at least a first layer (42) of the neural network while further groups of the image data are still being read out from the image sensor (24), thereby implementing on-the-fly or pipelined processing of data layers while still processing additional data layers,
and wherein the second processing unit (32) comprises a classical decoder (40) operating without the neural network for reading codes (20), and at least one of further layers (44) of the neural network and/or a further neural network are implemented on the second processing unit (32) in order to further process at least one of the image data and the processing results of the first processing unit (30).

2. The camera (10) according to claim 1, wherein the camera (10) is configured as a camera-based code reader.

3. The camera (10) according to claim 1, wherein the group of adjacent pixels is an image line or a part thereof, thus image lines are already processed by the first layer (42, 48) while further image lines are still being read out.

4. The camera (10) according to claim 1, wherein the first processing unit (30) comprises a field programmable gate array (FPGA).

5. The camera (10) according to claim 1, wherein the second processing unit (32) comprises a microprocessor.

6. The camera (10) according to claim 1, wherein the neural network (42) is configured for a segmentation of the image data for locating at least one of regions of interest and code regions (20).

7. The camera (10) according to claim 1, wherein the at least first layer (42) of the neural network on the first processing (30) generates a feature map which is stored as a processing result in the memory (34).

8. The camera (10) according to claim 7, wherein the feature map comprises a probability map including probability information about locations of codes in the image data.

9. The camera (10) according to claim 7, wherein the feature map has a lower resolution than the image data of the image sensor.

10. The camera (10) according to claim 1, wherein the first processing unit (30) comprises at least a first buffer memory (50, 54) for temporarily storing processing results of the at least first layer (42).

11. The camera (10) according to claim 1, wherein at least one neural network layer (42) implemented on the first processing unit (30) comprises a step size greater than one, i.e. whose convolution kernel is shifted by more than one pixel at a time.

12. The camera (10) according to claim 1, wherein at least one neural network layer (42) implemented on the first processing unit (30) comprises a dilated convolution kernel that processes pixels that are not directly adjacent.

13. The camera (10) according to claim 1, wherein the first processing unit (30) is configured to store the read-out image data in the memory (34).

14. The camera (10) according to claim 1, wherein the first processing unit (30) is configured to store the read-out image data in the memory (34) after preprocessing.

15. The camera (10) according to claim 1, wherein the further processing includes reading of codes (20).

16. The camera (10) according to claim 1, wherein at least two neural networks (60, 62) are implemented on the second processing unit (32), each of which further processes processing results of the first processing unit (30).

17. The camera (10) according to claim 1, comprising at least one additional processing unit (56) for processing steps of the neural network (58).

18. The camera (10) according to claim 17, wherein the additional processing unit (56) comprises at least one of an NPU (Neural Processing Unit) and a GPU (Graphics Processing Unit).

19. A method for processing image data with a plurality of pixels, comprising the steps of:
reading out the image data from an image sensor (24) in an image data stream of groups of adjacent pixels using a first processing unit (30);
processing the image data by means of a neural network (38) comprising a Convolutional Neural Network (CNN) implemented on at least one of the first processing unit (30) and a second processing unit (32); and
storing at least one of the image data and processing results in a memory (34), wherein the first processing unit (30) starts processing groups of pixels with at least a first layer (42) of the neural network while further groups of image data are still being read out from the image sensor (24), thereby implementing on-the-fly or pipelined processing of data layers while still processing additional data layers, and wherein the second processing unit (32) comprises a classical decoder (40) operating without the neural network for reading codes (20), and at least one of further layers (44) of the neural network and/or a further neural network are implemented on the second processing unit (32) in order to further process at least one of the image data and the processing results of the first processing unit (30).

20. The method according to claim 19, wherein the group of adjacent pixels is an image line or a part thereof, thus image lines are already processed by the first layer (42, 48) while further image lines are still being read out.

21. The method according to claim 19, wherein the neural network (42) is configured for a segmentation of the image data for locating at least one of regions of interest and code regions (20).

* * * * *